United States Patent Office 3,240,814
Patented Mar. 15, 1966

3,240,814
PROCESS FOR THE PRODUCTION OF ALKALI BORON TETRAALKYL COMPLEX COMPOUNDS
Karl Ziegler, Kaiser Wilhelm Platz 1, Mulheim (Ruhr), Germany, and Herbert Lehmkuhl, Mulheim (Ruhr), Germany; said Lehmkuhl assignor to said Ziegler
No Drawing. Filed May 2, 1962, Ser. No. 192,008
Claims priority, application Germany, May 5, 1961, Z 8,721
12 Claims. (Cl. 260—606.5)

This invention relates to a process for the production of alkali boron tetraalkyl complex compounds.

Within the compass of works on organic derivatives of elements of main group III of the Periodic Table, organic boron compounds have lately become of constantly increasing importance. A particularly important class of compounds is represented by the general formula $MBR_4$ wherein M is an alkali metal and R is an alkyl radical. While suggestions with respect to the production of these alkali boron tetraalkyl complexes have been made, the processes which have become known up to the present still exhibit a number of deficiencies from the process engineering point of view.

It is an object of this invention to provide a process for the production of these boron complex compounds, which process furnishes the compounds desired in a quantitative yield and in as simple a manner as is possible. It has been found very surprisingly that particularly satisfactory results are obtained when using aluminum-organic compounds as process aids for the production desired in place of attempting to produce the boron compound desired by a direct synthesis.

In accordance with the invention, a process for the production of alkali boron tetraarlkyl complex compounds of the general formula $MBR_4$ comprises reacting free boron trialkyls of the general formula $BR_3$ with aluminum complex compounds of the general formula $M(AlR_3OR')$. In these general formulae, M is an alkali metal, R is an alkyl radical and R' is an alkyl or cycloalkyl radical which may be substituted. It is particularly preferred in the process of the invention to use aluminum complex compounds in which M is sodium, potassium or a mixture of sodium and potassium. There is practically no restriction to the reaction of the invention with respect to the alkyl radical R. However, in practice, preferred use will be made of boron and aluminum compounds in which R is a lower alkyl radical. The process of the invention is of particular importance for the production of boron tetraalkyl complex compounds in which the radical R represents alkyl radicals having up to 3 carbon atoms. Since, as will be shown hereafter, the reaction of the invention involves the transfer of an alkyl radical from the aluminum complex compound into the boron compound, it is accordingly particularly preferred also for the aluminum compound to use alkyl radicals having up to 3 carbon atoms as the radical R. The nature of the radical R' is likewise practically unlimited for the reaction principle of the invention. Here again, it is preferred in commercial practice to use alkyl radicals, particularly lower alkyl radicals, having up to 10 carbon atoms.

The principle of the reaction of the invention can be expressed by the following reaction equation:

$$BR_3 + M(AlR_3OR') \rightarrow MBR_4 + AlR_2OR'$$

Thus, when contacting free boron trialkyl with an alkali aluminum complex compound of the general formula mentioned above, a spontaneous rearrangement takes place which involves formation of the corresponding alkali boron tetraalkyl complex compound from the free boron trialkyl and simultaneous liberation of the aluminum compound of the general formula $AlR_2OR'$ which is no longer complexed. This exchange of the complexed state between the boron and aluminum compounds proceeds with extreme ease and completeness. While the reaction can, on principle, be carried out without the use of additional auxiliary means, it is preferred in accordance with the invention to effect the reaction in the presence of a solvent. Particularly suitable solvents are hydrocarbons in which the boron complex compound which is formed is insoluble. In carrying out the reaction, the boron complex compound is then obtained as a solid phase in the reaction mixture and is, therefore, recovered from the reaction mixture very easily, e.g. by filtration. This simple separation of the boron and aluminum compounds is of particular importance for compounds which are preferably used in the process of the invention, i.e. compounds wherein R is a lower alkyl group, particularly the ethyl group. Examples of suitable solvents for this purpose are aliphatic hydrocarbons, particularly hexane.

It is further preferred to effect the reaction at temperatures ranging below the boiling temperature of the free boron trialkyl. Thus, a suitable temperature range is, for example, from room temperature up to about 100° C., it being particularly preferred to operate in the range between 40° and 70° C. Even if the simple possibility described of separating the reaction mixture by separation into layers is not available, processing for the recovery of the complex boron compound does not offer any difficulty. In this case, the reaction mixture may be subjected to simple distillation in which the solvent and the free aluminum compound distil in this order while the boron complex compound remains as the bottoms. It is now extremely easy by means of the teaching of French Patent 1,223,643 to reconvert the compound of the general formula $AlR_2OR'$ into the aluminum complex compound of the formula $M(AlR_3OR')$. In particular, it is possible in this manner to recover the aluminum complex compound by reacting the free aluminum compound with an alkali metal, hydrogen and an olefin. While it is possible without the indirect method of the invention to produce alkali boron tetraalkyls by addition of alkali metal hydride to boron trialkyls and subsequent treatment with olefins in the presence of heat, this reaction does not proceed as smoothly as the analogous conversion of alkoxy aluminum dialkyls and offers greater difficulties. These are primarily due to the fact that alkali boron tetraalkyls, when heated, tend to split 1 molecule of olefin and to be converted into alkali boron trialkyl hydrides in a manner such that equilibria of the following kind are established.

$$NaB(C_nH_{2n+1})_4 \rightleftharpoons C_nH_{2n} + NaB(C_nH_{2n+1})_3H$$

The complex compound on the right hand side is identical with the addition product of sodium hydride to the corresponding boron trialkyl. The addition of olefins to this addition product to form sodium-boron tetraalkyl requires relatively high temperatures. However, when directly synthesizing alkali boron tetraalkyl complexes, these temperatures frequently fall already into a range where the decomposition equilibrium defined above becomes perceptible, i.e. the reaction does not proceed to completion. To avoid this, the temperature must be reduced and then the reaction will take a very extended period of time. The alkali-aluminum alkoxy-trialkyl complexes are thermally much more stable. Therefore, they are very easily synthesized even at higher temperatures via the alkali metal hydride addition products of alkoxy-aluminum dialkyls and the reaction of these with boron trialkyls takes place so readily and proceeds smoothly at sufficiently low temperatures to permit operation within the temperature range in which the alkali-boron tetraalkyls are entirely stable.

Accordingly, it is particularly preferred in accordance with the invention to use a complex aluminum compound which has been prepared by the reaction of free aluminum compounds of the formula $AlR_2OR'$, it being most preferred to reconvert the free aluminum compounds formed in the process of the invention into aluminum complex compounds in a separate process and re-use these in the process of the invention.

Thus, it is practically possible with this last-mentioned embodiment of the invention to convert unlimited amounts of free boron trialkyl into the complex boron compound with a given amount of the aluminum compound. The aluminum compound merely functions as an auxiliary agent for the transfer of the alkyl group and is recirculated between the regeneration step and the reaction of the invention in a separate cyclic process. The invention thus provides an indirect method of synthesizing alkali metal-boron tetraalkyl compounds from free boron trialkyl, alkali metal, hydrogen and olefin in substantially quantitative yields and in an extremely simple manner.

*Example 1*

0.28 mole (82 gms.) sodium-decyloxy-aluminum triethyl, $Na(C_2H_5)_3AlOC_{10}H_{21}$, is dissolved in 150 ml. of dry and air-free hexane and 39.5 ml. (0.28 mole) boron triethyl are added dropwise while stirring. The reaction mixture is heated for 2 hours at about 80° C. while refluxing the hexane. The finely crystalline precipitate of sodium-boron tetraethyl which is separated is filtered with suction on a glass frit under an inert gas atmosphere while observing the precautionary measures conventional for operation with air-sensitive organometallic and organic boron compounds. The precipitate is gain suspended in about 75 ml. of hexane, filtered again with suction and subsequently freed from residual hexane adhering thereto by subjecting it for 3 hours to 100° C. and $10^{-3}$ mm. Hg. The substance is analytically pure.

Analysis: 15.0% Na (calculated, 15.3%); 7.3% B (calculated, 7.2); M.P. 145° C.

Yield: 38 gms., i.e. 91% of the theoretical.

*Example 2*

0.34 mole (76.8 gms.) $K(C_2H_5)_3AlOnC_4H_9$ is suspended in 150 ml. of hexane contained in a dry reaction vessel filled with argon (250 ml. flask with lateral nozzle, reflux condenser and stirrer) and the suspension is mixed with 33.4 gms. (0.34 mole) $B(C_2H_5)_3$. The reaction mixture is heated for 3 hours at 60° C. while stirring. The finely crystalline precipitate formed of $KB(C_2H_5)_4$ is filtered with suction on a glass frit in the manner described in Example 1 for $NaB(C_2H_5)_4$, washed again with 100 ml. hexane, filtered again with suction and subsequently freed from residual hexane at 100° C. and $10^{-3}$ mm. Hg. The substance is likewise analytically pure.

Analysis: 23.5% K (calculated, 23.5%); 6.5% B (calculated, 6.5%); melting point: 163.5° C.

Yield: 83% of theoretical.

The hexane is distilled off from the combined hexane solutions using finally a vacuum of 14 mm. Hg and a bath temperature of 100° C. and while cooling the receiver to −80° C. The distillation bottoms consist of pure $(C_2H_5)_2AlOC_4H_9$ in a quantitative yield and can be reconverted with NaH and ethylene in a manner known per se into $NaAl(C_2H_5)_3OC_4H_9$ which can be reused for another reaction with boron triethyl.

*Example 3*

0.2 mole (45 gms.) $Na(C_3H_7)_3AlOC_2H_5$ is mixed with 100 ml. hexane and 0.2 mole (28 gms.) $B(C_3H_7)_3$ is added dropwise. The reaction mixture is heated for 4 hours at 60° C. while stirring. Following this, the hexane is first distilled off under a low vacuum (at 40–50° C. and 15 mm. Hg while cooling the receiver). Then the aluminum ethoxydipropyl is distilled off at about 70° C. and $10^{-3}$ mm. Hg. The distillation bottoms consist of pure $NaB(C_3H_7)_4$ in a quantitative yield. Care should be taken in case of this reaction that the temperature does not exceed 90° C. in any phase since otherwise propylene is slit off from the organic boron compound.

*Example 4*

0.2 mole (33.6 gms.) $Na(CH_3)_3AlOC_4H_9$ is dissolved in 100 ml. dry tetrahydrofurane. Then 0.2 mole (11.2 gms.) boron trimethyl is condensed by cooling to −40° C. The reaction mixture is allowed to heat slowly to room temperature while stirring and then stirring is continued for another 2 hours at 40–50° C. After having distilled off the tetrahydrofurane, the reaction mixture is heated to 100° C. under a vacuum of about 1 mm. Hg. In doing so, 26 gms. $Al(CH_3)_2OC_4H_9$ distil, i.e. 100% of the theoretical amount. The distillation bottoms consist of pure $NaB(CH_3)_4$ in amount of 18.8 gms. corresponding to 100% of the theoretical amount.

What is claimed is:

1. A process for the production of alkali metal boron tetraalkyl complex compounds having the formula $MBR_4$, which comprises reacting a free boron trialkyl $BR_3$ with an aluminum complex compound having the formula $M(AlR_3OR')$, wherein M is an alkali metal, R is alkyl and R' is a member selected from the group consisting of alkyl and cycloalkyl and recovering the boron tetraalkyl complex compound formed from the reaction mixture.

2. The process of claim 1, wherein M is a member selected from the group consisting of sodium and potassium, R is lower alkyl, and R' is alkyl containing up to 10 carbon atoms.

3. The process of claim 1 wherein R and R' designate the same alkyl.

4. The process of claim 1, which comprises effecting said reaction in the presence of an inert solvent.

5. The process of claim 4, wherein said solvent is a non-solvent for the compound $MBR_4$.

6. The process of claim 5 wherein said solvent is an aliphatic hydrocarbon.

7. The process of claim 1, which comprises effecting said reaction at a temperature below the boiling point of the free boron trialkyl.

8. The process of claim 7, which comprises effecting said reaction at a temperature of between 40 and 70° C.

9. The process of claim 1, which comprises recovering the boron tetraalkyl complex compound produced as a solid phase from the reaction mixture by separation of layers.

10. The process of claim 1, which comprises recovering the boron tetraalkyl complex compound produced in the reaction by distillation, said boron tetraalkyl compound being recovered as the distillation bottoms.

11. The process of claim 1, wherein said aluminum complex compound is obtained by reacting a free aluminum compound having the formula $AlR_2OA'$ with an alkali metal, hydrogen and an olefin.

12. The process of claim 11, wherein said free aluminum compound is derived from the process of the invention.

No references cited.

TOBIAS E. LEVOW, *Primary Examiner.*

LEON D. ROSDOL, *Examiner.*